US008800847B2

(12) United States Patent
Castillo et al.

(10) Patent No.: US 8,800,847 B2
(45) Date of Patent: Aug. 12, 2014

(54) DYNAMIC PATH CORRECTION OF FRICTION STIR WELDING

(75) Inventors: Alfredo Castillo, San Jose, CA (US); Umakaran Nemallan, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/560,981

(22) Filed: Jul. 27, 2012

(65) Prior Publication Data

US 2013/0327813 A1    Dec. 12, 2013

Related U.S. Application Data

(60) Provisional application No. 61/657,786, filed on Jun. 9, 2012.

(51) Int. Cl.
*B23K 20/12*    (2006.01)
(52) U.S. Cl.
USPC .......... 228/112.1; 228/113; 228/114; 228/2.1
(58) Field of Classification Search
USPC ................... 228/112.1, 113, 114, 2.1
See application file for complete search history.

(56) References Cited

U.S. PATENT DOCUMENTS

| 6,168,066 | B1 | 1/2001 | Arbegast | |
|---|---|---|---|---|
| 6,499,649 | B2 | 12/2002 | Sayame et al. | |
| 6,742,696 | B2 | 6/2004 | Thompson | |
| 7,850,057 | B2 | 12/2010 | Fleming et al. | |
| 8,011,560 | B2 | 9/2011 | Chen et al. | |
| 2002/0027155 | A1* | 3/2002 | Okamura et al. | 228/112.1 |
| 2008/0073409 | A1* | 3/2008 | Ostersehlte | 228/102 |

* cited by examiner

*Primary Examiner* — Erin Saad
(74) *Attorney, Agent, or Firm* — Womble Carlyle Sandridge & Rice LLP

(57) ABSTRACT

A method for controlling friction stir welding is provided. The method may include initiating friction stir welding and determining the position of a friction stir welding tool and at least one part being welded. The method may also include adjusting the position of the friction stir welding tool while friction stir welding based at least in part on the positions of the tool and at least one of the parts. The position of the parts may be determined downstream of the friction stir welding tool in order to prospectively account for the position of the parts. Accordingly, the position of the friction stir welding tool may be dynamically adjusted during friction stir welding to account for part movement. Related systems and computer code are provided.

17 Claims, 12 Drawing Sheets

US 8,800,847 B2

DYNAMIC PATH CORRECTION OF FRICTION STIR WELDING

CROSS-REFERENCE TO RELATED APPLICATIONS

This application claims the benefit of U.S. Provisional Application No. 61/657,786, filed Jun. 9, 2012, which is entirely incorporated herein by reference.

FIELD OF THE DESCRIBED EMBODIMENTS

The described embodiments relate generally to manufacturing processes and more particularly to controlling a welding operation.

BACKGROUND

Various types of methods and apparatuses have been developed for joining two parts. Example embodiments of methods for joining two parts include adhesive bonding, welding, use of fasteners, etc. In the context of joining certain materials, such as metals, welding has been identified as a suitable method presently in use today.

Various forms of welding methods exist. Example embodiments of welding methods include laser welding, arc welding, gas welding, and friction stir welding. Each type of welding relies on certain differing methods and systems to join parts.

Friction stir welding may present certain advantages over other forms of welding. For example, friction stir welding may not involve heating the parts being welded to as great of an extent as other forms of welding. Further, friction stir welding may not require use of flux or gases which could introduce contaminants into the weld. However, precisely controlling friction stir welding may present certain challenges.

Therefore, improved methods and systems for controlling friction stir welding may be desirable.

SUMMARY

A method for controlling friction stir welding is provided. The method may include initiating friction stir welding and determining the position of a friction stir welding tool and at least one of the parts being friction stir welded. In some embodiments optical sensors may be employed to determine the position of the friction stir welding tool and/or the part(s). However, various other embodiments of sensors may be employed. The position of the friction stir welding tool may be adjusted based on the determined positions of the friction stir welding tool and at least one of the parts.

Accordingly, rather than employing a pre-set path, the friction stir welding tool may be directed along a path that takes into account the actual position of the parts being welded. In this regard, parts may tend to shift positions during friction stir welding. Thus, the resulting weld may be more accurately positioned with respect to the desired position of the weld by dynamically adjusting the position of the friction stir welding tool.

In some embodiments the position of the part(s) may be determined downstream of the friction stir welding tool. Thereby, the position of the friction stir welding tool may be prospectively adjusted based on the positions of the parts. An approximation of the part positions may be based on the determined positions at two or more downstream locations in some embodiments. The approximation may be adjusted to account for the change in position of the parts as the welding tool moves downstream in some embodiments. This may provide for additional accuracy in forming the weld.

Related systems and computer code for friction stir welding are also provided.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF SELECTED EMBODIMENTS

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Friction stir welding is a method for joining two parts which may present certain advantages over other forms of welding. For example, friction stir welding may not heat the parts being welded to as great of an extent as other forms of welding. In this regard, certain materials may not be able to withstand temperatures associated with other forms of welding. Further, subjecting the parts to high heat may cause the parts to warp. Stresses may also build at the joint as a result of the heat that may eventually lead to failure of the weld.

Additionally, friction stir welding be advantageous in that it may not require use of flux or gases which could introduce contaminants into the weld. Introduction of contaminants into the weld may affect other operations later performed on the parts. For example, it may be more difficult to anodize the parts when contaminants have been introduced into the weld.

Friction-stir welding is a solid-state joining process (meaning the metal is not melted) and may be used in applications where the original metal characteristics must remain unchanged as far as possible. Friction stir welding functions by mechanically intermixing the two pieces of metal at the place of the joint, transforming them into a softened state that allows the metal to be fused using mechanical pressure. This process is primarily used on aluminum, although other materials may be welded, and is most often used on large pieces which cannot be easily heat treated post weld to recover temper characteristics.

Figure 1:
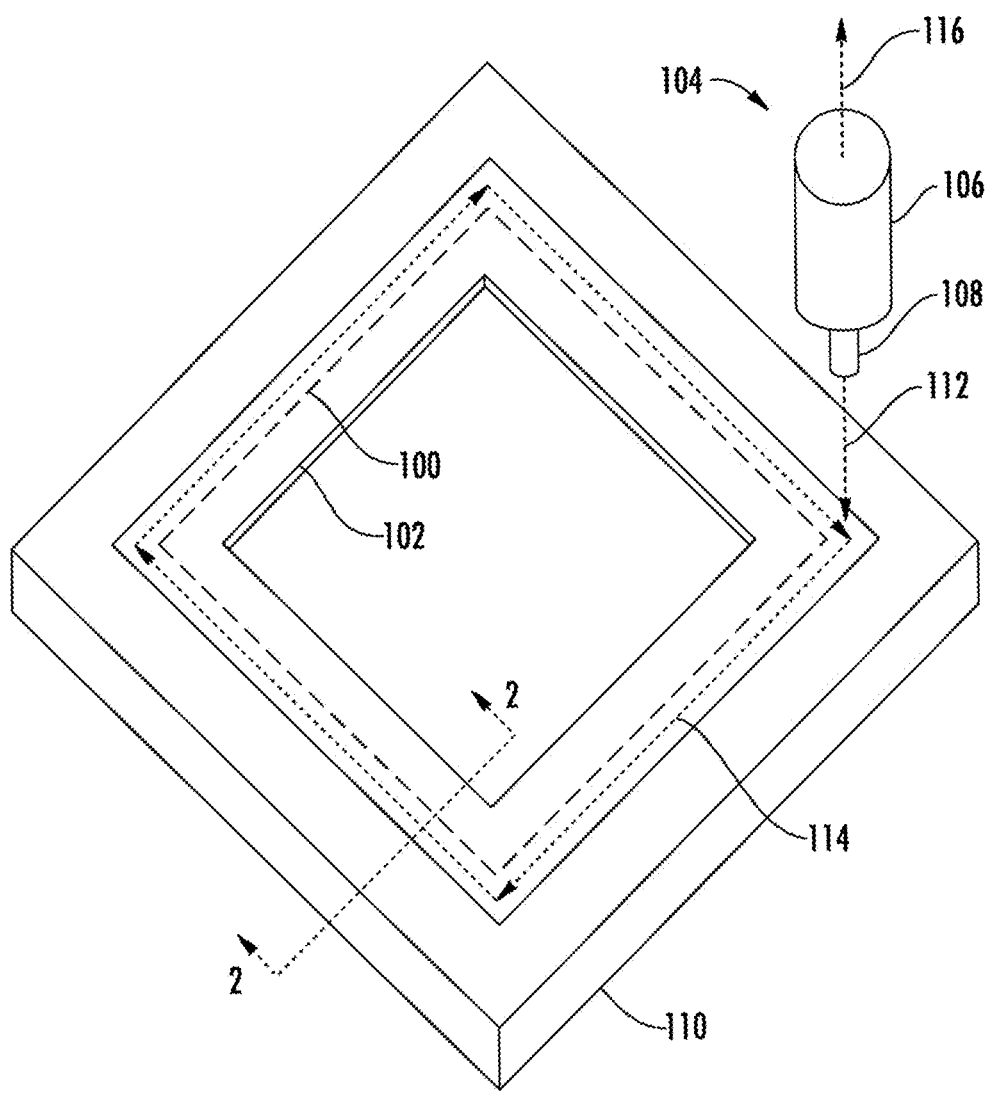
FIG. 1 illustrates a system and method for friction stir welding employing a fixture and friction stir welding tool.
Figure 2:
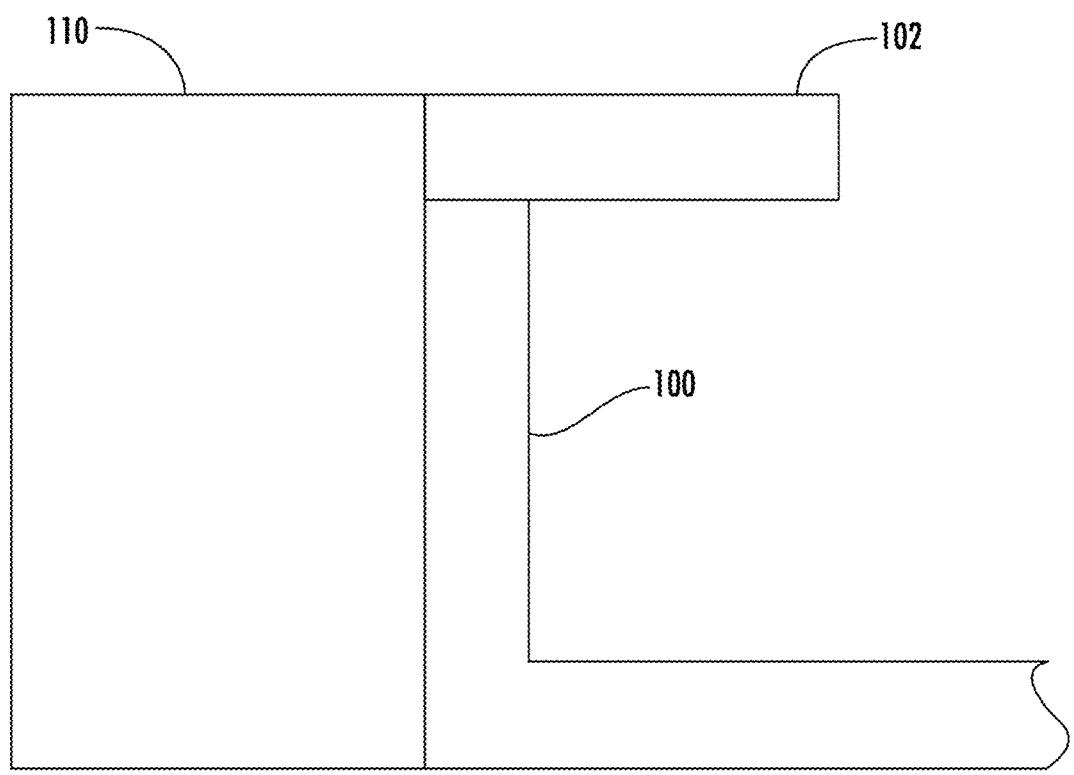
FIG. 2 illustrates a cross-sectional view through the system of FIG. 1 along line 2-2.

FIG. 1 schematically illustrates an example embodiment of the friction stir welding process and system. As illustrated, a first part 100 can be joined to a second part 102 via friction stir welding using a constantly rotated friction stir welding tool 104 including a shoe 106 and a pin 108 extending therefrom. A fixture 110 may be employed to retain the first part 100 and the second part 102 in the desired configuration. As illustrated in FIG. 2, which is a cross-sectional view along line 2-2, the first part 100 and the second part 102 may be configured perpendicularly to one another to form a joint in some embodiments.

As illustrates in FIG. 1, in order to weld the first part 100 and the second part 102 together, the friction stir welding tool 104 may initially be inserted into the joint, for example, by directing the tool downwardly along a path 112. The friction stir welding tool 104 may then be transversely fed along a path 114 following the desired position of the weld between the first part 100 and the second part 102. The pin 108 may be slightly shorter than the weld depth required, with the shoe 106 riding atop the work surface.

Frictional heat is generated between the wear-resistant welding components defining the friction stir welding tool 104 and the parts 100, 102 being welded. This heat, along with that generated by the mechanical mixing process and the adiabatic heat within the material, cause the stirred materials to soften without melting. As the pin 108 is moved forward along the path 114 the plasticized material moves to the rear where clamping force may assist in a forged consolidation the weld. This process of the friction stir welding tool 104 traversing along the weld line in a plasticized tubular shaft of material may result in severe solid state deformation involving dynamic recrystallization of the base material. After traversing the path 114 at the joint, the friction stir welding tool 104 may be lifted from the material along a path 116. Accordingly, a weld may be created the first part 100 and the second part 102.

However, friction stir welding may present certain issues that may make forming a strong and aesthetically pleasing weld difficult. In this regard, friction stir welded parts using a stationary fixture and pre-set (e.g., pre-programmed) tool path can result in an inferior weld joint due in part to the different stresses on the two parts being welded. This is particularly true when a friction stir welding pin traverses a pre-set tool path that does not account for changes in part position.

Figure 3:
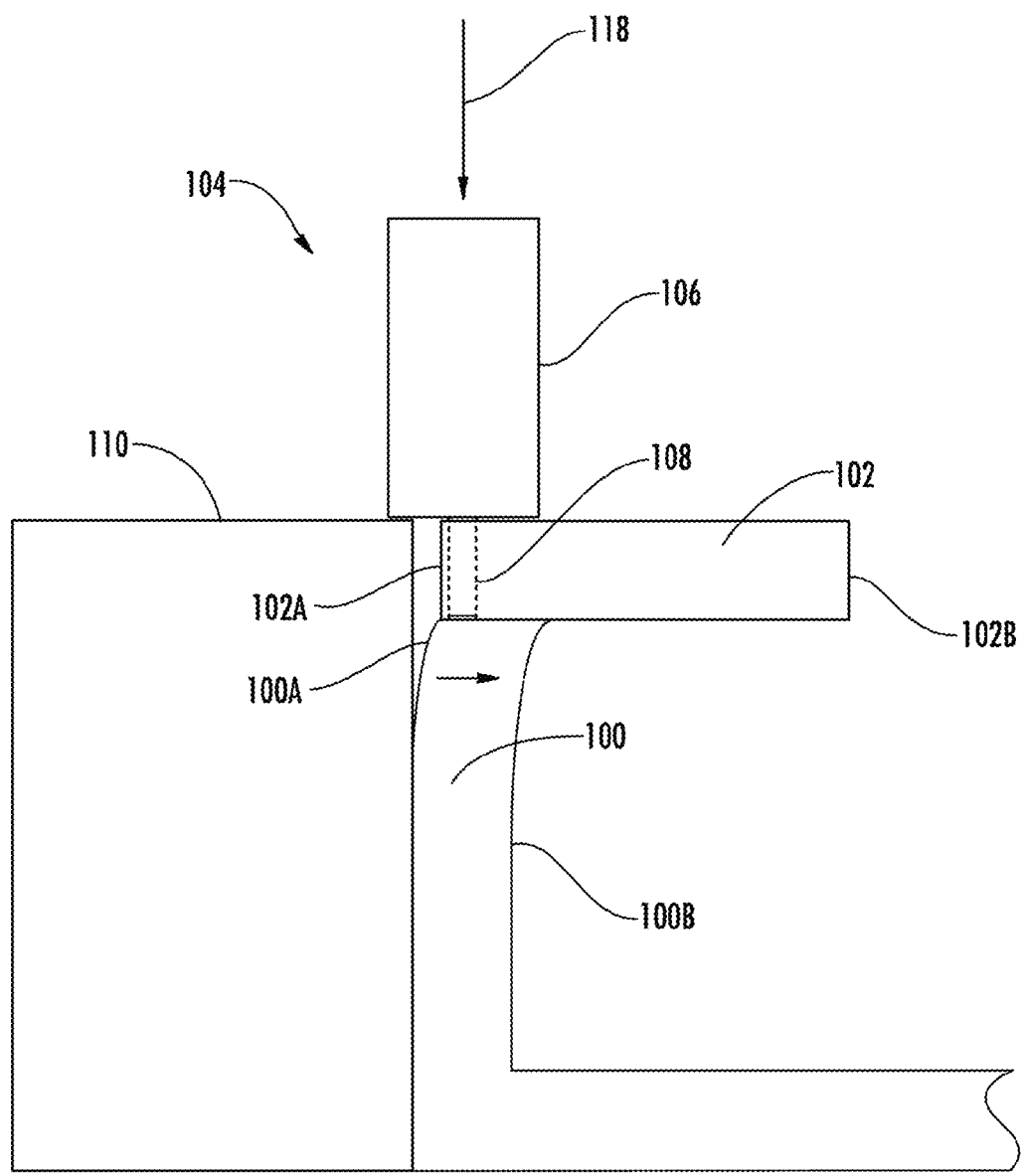
FIG. 3 illustrates a cross-sectional view through the system of FIG. 1 along line 2-2 when the friction stir welding tool reaches this location.

For example, as illustrated in FIG. 3, an axial force 118 may be applied by the friction stir welding tool along the rotational axis thereof. The axial force 118, which may be on the order of 2-4 kN (kilo-newtons) in some embodiments, may cause part geometry to change. In this regard, as illustrated in FIG. 3, in some embodiments the fixture 110 may support outer edges 100A, 102A of the parts 100, 102, while leaving inner edges 100B, 102B thereof unsupported. Thus, the inner edges 100B, 102B of the parts may bow inwardly away from the fixture 110 when subjected to the axial force 118, as illustrated.

As a result of movement of one or both of the parts 100, 102, a weld created by a tool moved along a pre-set path may be detrimentally affected. For example, if one or both of the parts being welded is no longer in the same position as required by the pre-set path, defects can arise. In this regard, the movement of the parts during friction stir welding may be difficult to predict, and accordingly use of a pre-set path may present issues even when the pre-set path attempts to predict movement of the parts.

Figure 4:
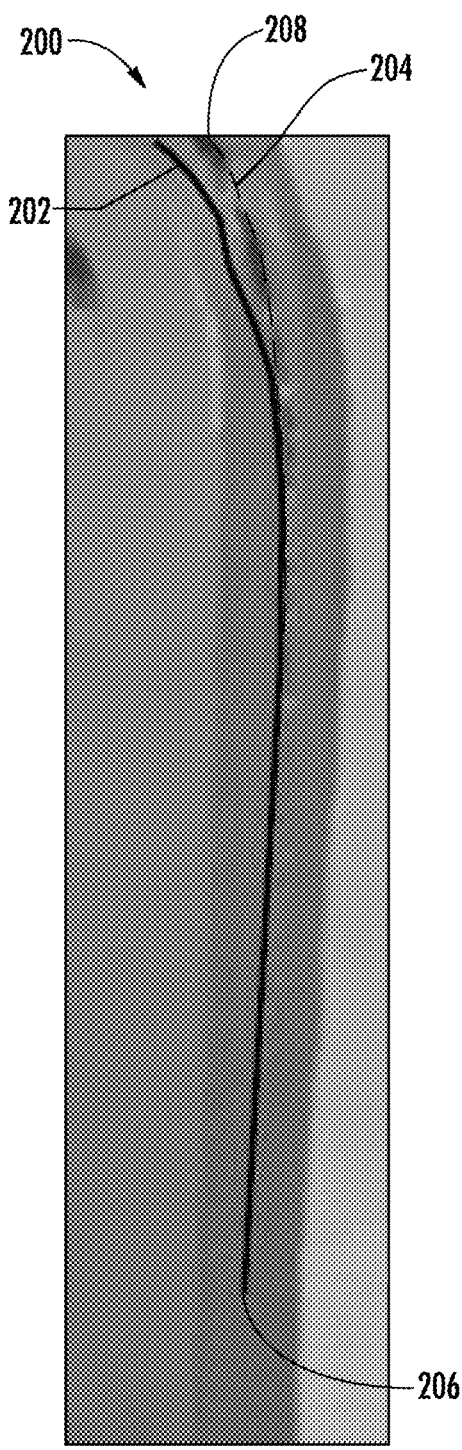
FIG. 4 illustrates example results of a friction stir welding operation using conventional path control with a pre-set welding path.

FIG. 4 illustrates a view of a weld 200 created by friction stir welding. A desired weld path 202 (e.g., a centerline of the parts) is shown in addition to the actual weld path 204 created by a pre-set weld path. As illustrated, when the desired weld path 202 and the actual weld path 204 of the parts align, a clean weld is produced, for example at position 206. However, where the desired weld path 202 deviates from the actual weld path 204, voids, cracks, and/or other defects are produced, for example at position 208.

Figure 5:
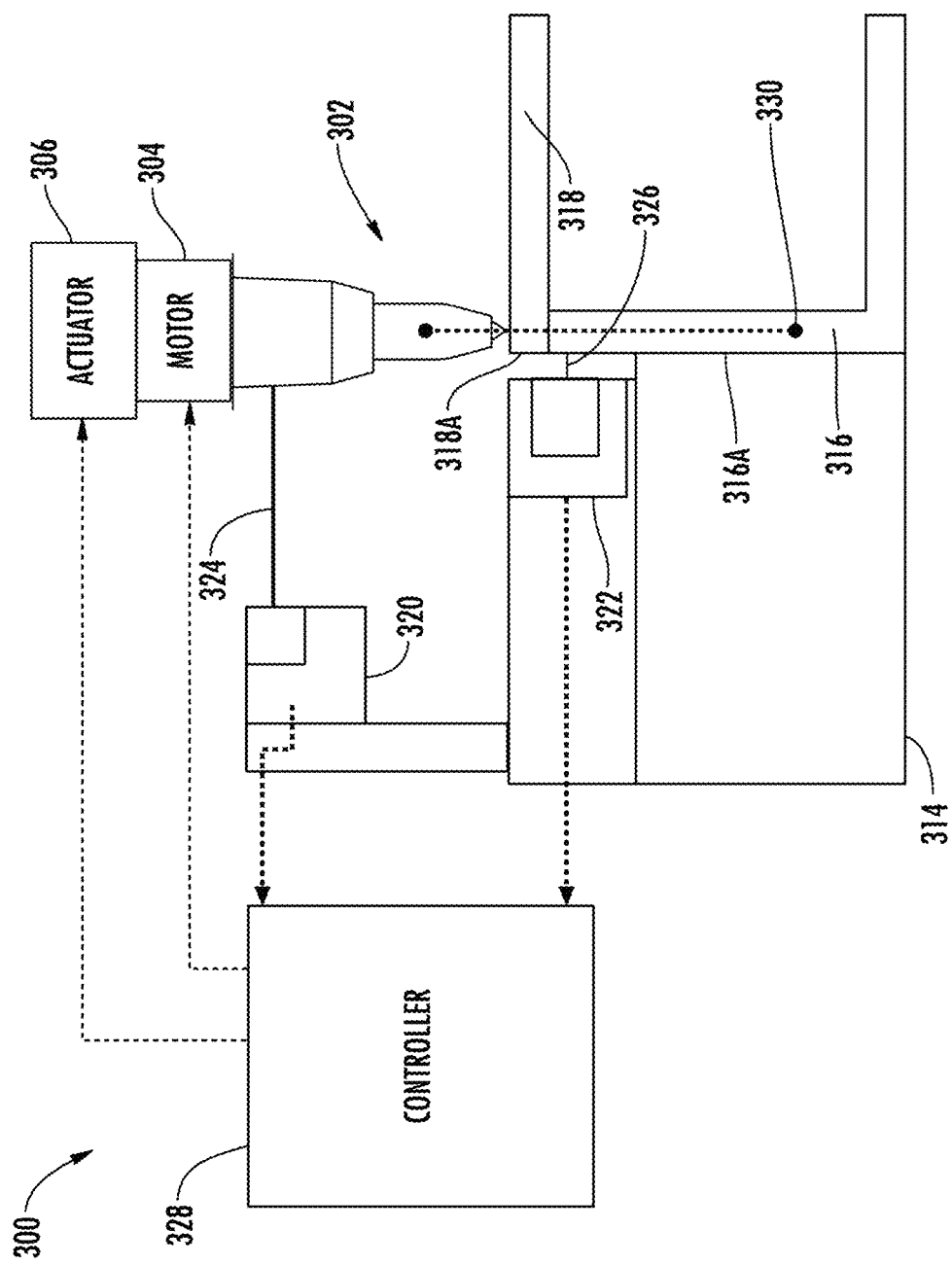
FIG. 5 illustrates a schematic view of a system for friction stir welding including part and tool sensors configured to perform dynamic path correction according to an example embodiment of the present disclosure.

Accordingly, embodiments of the present disclosure provided herein are configured to minimize such defects by actively adjusting the path of the tool during movement thereof. For example, FIG. 5 shows a system 300 for friction stir welding using dynamic path correction in accordance with the described embodiments. The system 300 may include a friction stir welding tool 302, which may be rotated by a motor 304. The position of the friction stir welding tool 302, and the motor 304 in some embodiments, may be controlled by an actuator 306. Thereby, the actuator 306 may displace the friction stir welding tool 302 relative to the parts being welded.

Figure 6:
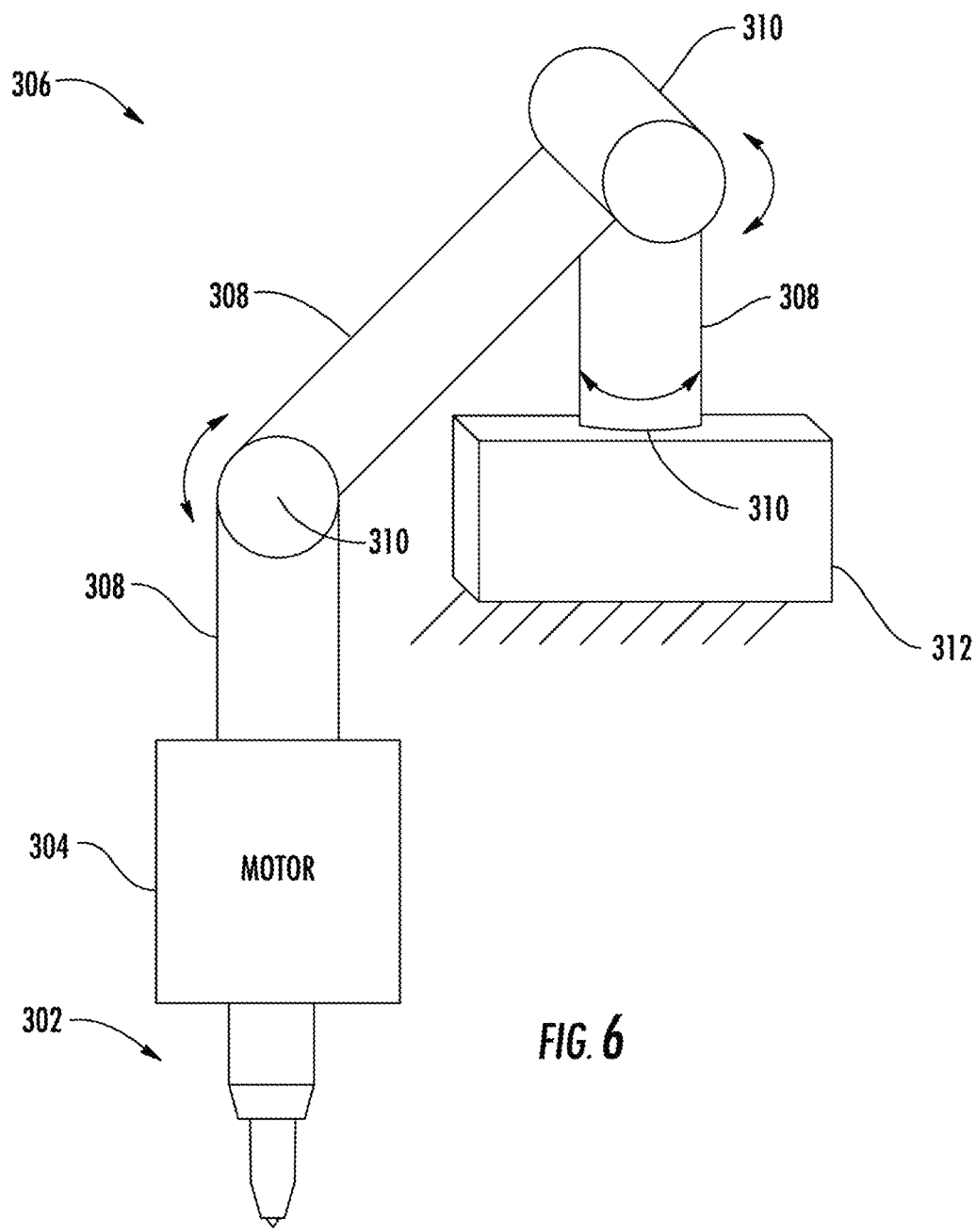
FIG. 6 illustrates an actuator, motor, and friction stir welding tool that may be included in the friction stir welding system of FIG. 5 according to an example embodiment of the present disclosure.

As illustrated in FIG. 6, in one embodiment the actuator 306 may comprise a robotic assembly. For example, the actuator 306 may include one or more arms 308, one or more joints 310, and a base 312. Thus, the arms 308 may be rotated about the joints 310 to position the tool 302 at an appropriate position to friction stir weld. However, various other embodiments of actuators (e.g., gantry systems) may be employed to control the position of the tool 302.

The friction stir welding system 200 may further comprise a fixture 314, as illustrated in FIG. 5. The fixture 314 may be configured to hold a first part 316 and a second part 318. For example, as described above, the fixture 314 may be in contact with an outer surface 316A, 318A of at least one of the parts 316, 318.

As shown, the system 300 may further comprise one or more sensors 320, 322. In one embodiment the sensors 320, 322 may be mounted to the fixture 314. The sensors may include a tool sensor 320 configured to determine the position of the friction stir welding tool 302 and a part sensor 322 configured to determine the position of at least one of the first part 316 and the second part 318. In the illustrated embodiment the tool sensor 320 is configured to measure a distance 324 between the tool sensor and the tool friction stir welding tool 302 and the part sensor 322 is configured to measure a distance 326 between the part sensor and the outer surface 316A of the first part 316.

A controller 328 may be in communication with one or more of the motor 304, the actuator 306, the tool sensor 320, and the part sensor 322. Thereby, the controller 328 may direct operation of one or more of the motor 304 and the actuator 306 and receive information from the sensors 320, 322. In this regard, the actuator 306, the sensors 320, 322 and the controller 328 may collectively define a path control device configured to control a path traversed by the friction stir welding tool 302 with respect to the first part 316 and the second part 318.

During operation, the motor 304 rotates the friction stir welding tool 302 and the actuator 306 positions the friction stir welding tool such that the friction stir welding tool friction stir welds the first part 316 to the second part 318. In one embodiment the controller 328 may instruct the actuator 306 to initially position the friction stir welding tool 302 at a pre-set starting point, and then the friction stir welding tool may begin moving along a pre-set path. However, in another embodiment, the controller 328 may instruct the actuator 306 to initially position the friction stir welding tool 302 at a starting point and then begin moving based on the position of the friction stir welding tool and at least one of the parts 316, 318 as determined by the sensors 320, 322.

Regardless of how the initial starting point is determined, the controller 328 may be configured to instruct the actuator 306 to adjust the position of the friction stir welding tool 302 while friction stir welding the first part 316 to the second part 318 based at least in part on the position of the friction stir welding tool and the position of at least one of the first part and the second part. In this regard, as noted above, the tool sensor 320 may determine the position of the friction stir welding tool 302 by measuring the distance 324 from the tool sensor to the friction stir welding tool and the part sensor 322 may determine the position of at least one of the first part 316 and the second part 318 by measuring the distance 326 from the part sensor to one or both of the parts. The controller 328 may then calculate the relative distance between the friction stir welding tool 302 and at least one of the parts 316, 318 and instruct the actuator 306 to adjust the position of the friction stir welding tool to more closely align with a desired weld alignment with respect to the parts. For example, the desired weld alignment may correspond to a centerline 330 of the first part 316, as illustrated. In this regard, the controller 328 may compensate for the width of the friction stir welding tool 302 and the width of the first part 316 in determining where to position the friction stir welding tool.

In order to adjust the position of the friction stir welding tool 302 to more closely align with a desired weld alignment with respect to the parts 316, 318 (e.g., with the centerline 330), the adjustments may be made reactively, as the friction stir welding tool traverses the length of the parts as they are welded together. In other words, the position of the friction stir welding tool 302 may be adjusted at a location along the path traversed by the friction stir welding tool after the friction stir welding tool reaches the location and the position of the parts 316, 318 and the friction stir welding tool at that location is determined by the sensors 320, 322.

However, rather than reactively adjusting the position of the friction stir welding tool 302, in another embodiment the path control device may determine the position of the parts 316, 318 downstream of the friction stir welding tool (e.g., in front of the friction stir welding tool in the welding direction traversed by the friction stir welding tool). Accordingly, the controller 328 may instruct the actuator 306 to adjust the position of the friction stir welding tool 302 to prospectively account for the position of the parts 316, 318 in front of the friction stir welding tool.

Figure 7:
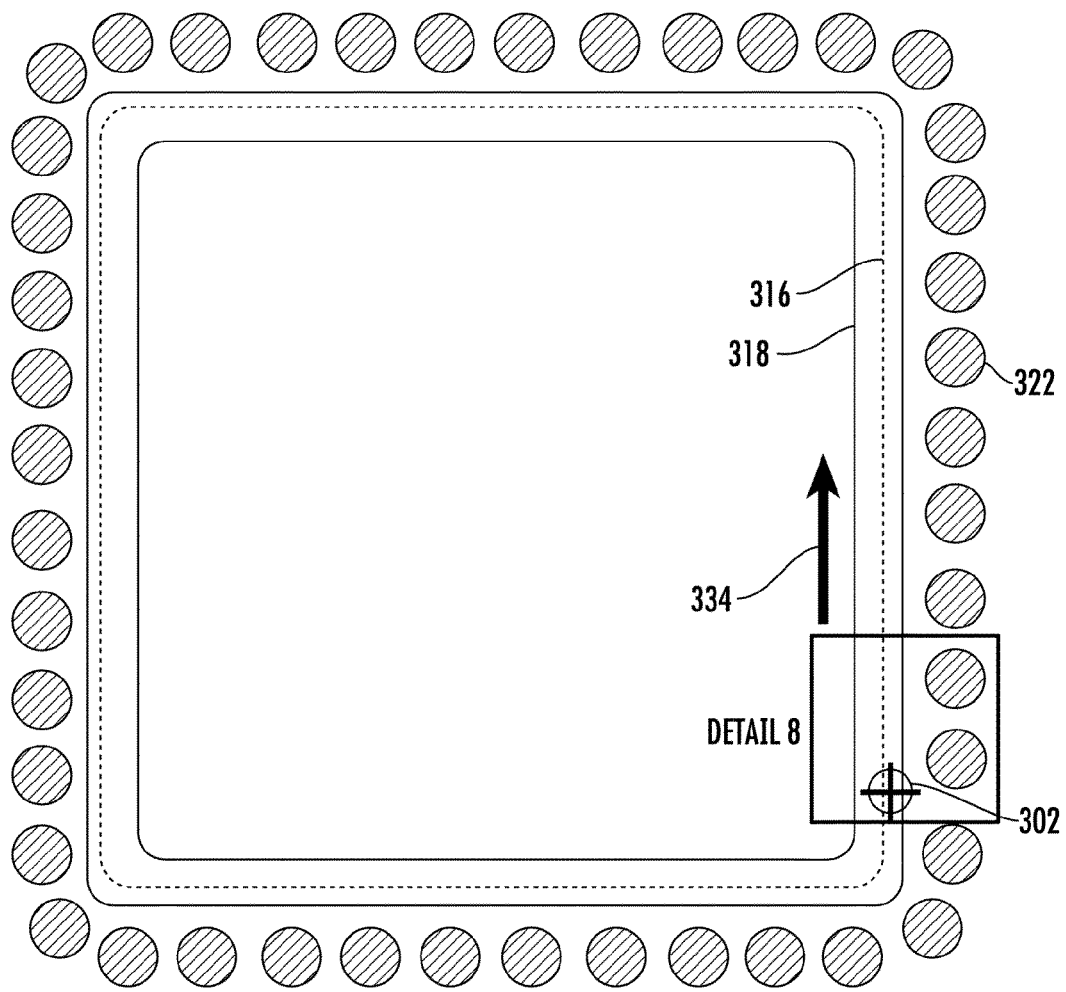
FIG. 7 illustrates an overhead schematic view of a portion of the system of FIG. 5 according to an example embodiment of the present disclosure.
Figure 8:
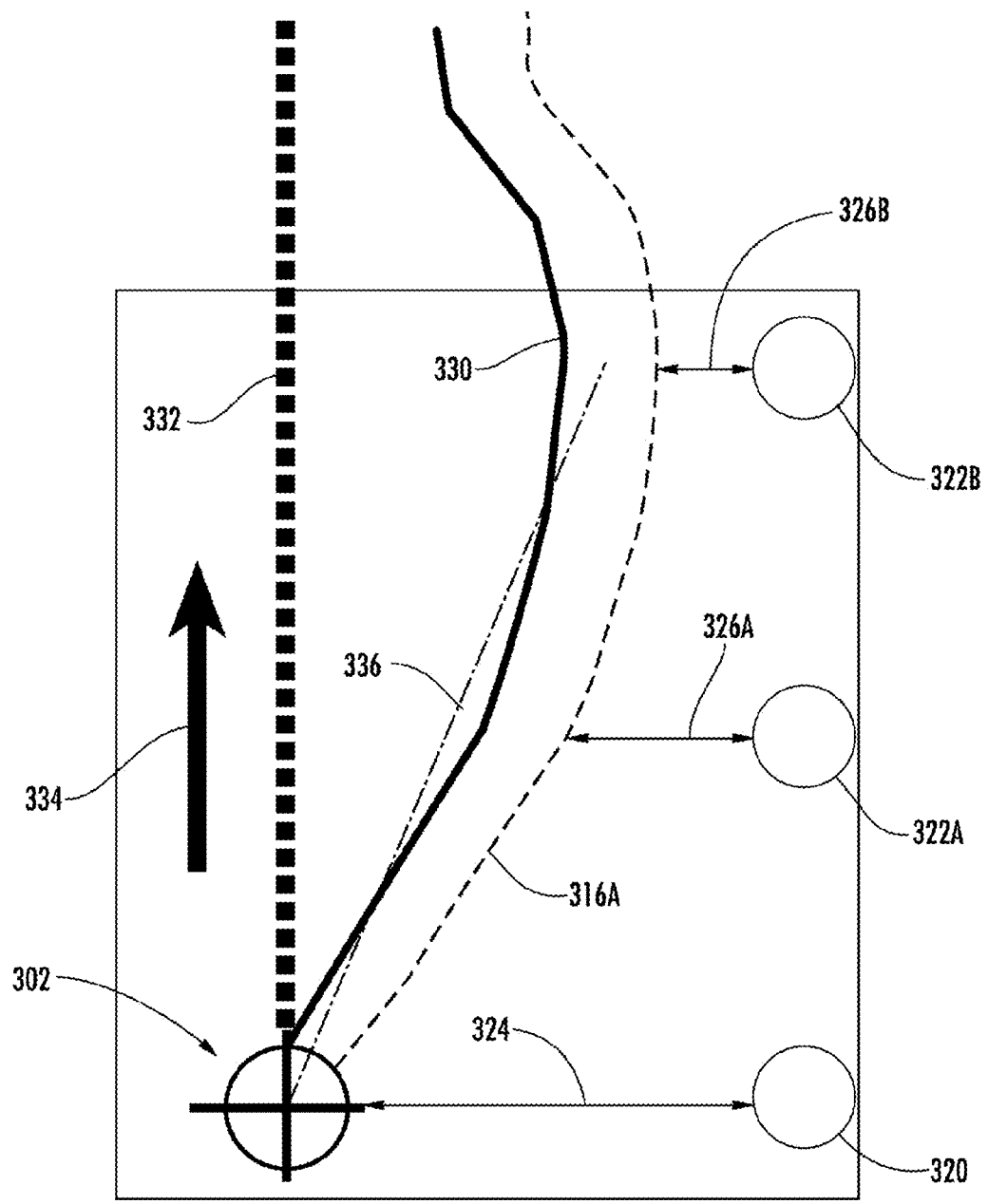
FIG. 8 is an enlarged view of DETAIL 8 from FIG. 7, in which dynamic path correction is illustrated according to an example embodiment of the present disclosure.

Accordingly, as illustrated in FIG. 7, which is an overhead schematic view of a portion of the system 300, the system may include a plurality of the part sensors 322 mounted around the perimeter of the parts 316, 318 being welded. FIG. 8 illustrates an enlarged view of DETAIL 8 from FIG. 7, during friction stir welding. As illustrated, using traditional friction stir welding techniques, the friction stir welding tool 302 may traverse along a pre-set path 332. However, as noted above, one or both of the parts 316, 318 may shift position during friction stir welding such that the pre-set path 332 no longer aligns with a center line 330 of the parts (or other desired welding configuration).

Accordingly, the tool sensor 320 may be configured to determine the present position of the friction stir welding tool 302 by measuring the distance 324 between the tool sensor and the friction stir welding tool. Further, the part sensors 322 may be configured to measure the distance 326 between the part sensor and at least one of the parts 316, 318. In order to prospectively adjust the position of the friction stir welding tool 302, the part sensors 322 may determine the position of at least one of the parts 316, 318 (e.g., the first part in the illustrated embodiment) downstream of the friction stir welding tool. In this regard, arrow 334 illustrates the general direction of travel of the friction stir welding tool 302 and thus points downstream.

In one embodiment a first part sensor 322A may determine the position of the first part 316 by measuring a distance 326A to the outer edge 316A thereof at a first location downstream of the friction stir welding tool 302. Further, a second part sensor 322B may determine the position of the first part 316 by measuring a distance 326B to the outer edge 316A thereof at a second location downstream of the first location. Accordingly, an approximation of the position of at least one of the parts 316, 318 may be calculated (e.g., by the controller 328). In one embodiment the approximation 336 may comprise a linear approximation of the centerline 330 of the parts at the present time. For example, the slope of the linear approximation 336 may be based on the determined positions of at least one of the parts 316, 318 at the first location and the second location. However, various other approximations may be employed, which may be non-linear (e.g., by approximating the position at three or more downstream locations).

Further, in some embodiments the approximation 336 may be adjusted to determine an expected position of at least one of the first part 316 and the second part 318. In this regard, the positions of the first part 316 and the second part 318 may shift from their present positions as the friction stir welding tool 302 continues to move downstream. Accordingly, the approximation 336 may be adjusted in some embodiments to account for the expected position of at least one of the first part 316 and the second part 318 based on factors such as the rigidity of the parts, the response of the parts to heat, empirically determined response to movement of the friction stir welding tool, etc.

However, regardless of whether the approximation 336 is adjusted for the expected position of at least one of the parts 316, 318, the approximation may more accurately follow the desired weld path (e.g., the centerline 330) as compared to a pre-set weld path that does not account for part movement (e.g., pre-set path 332). Accordingly, a stronger and more aesthetically pleasing weld may be produced. The above-described procedures may be iteratively repeated as the friction stir welding tool 302 moves downstream. Accordingly, the path followed by the friction stir welding tool 302 may be dynamically adjusted while the frictions stir welding tool welds the parts 316, 318.

Figure 9:
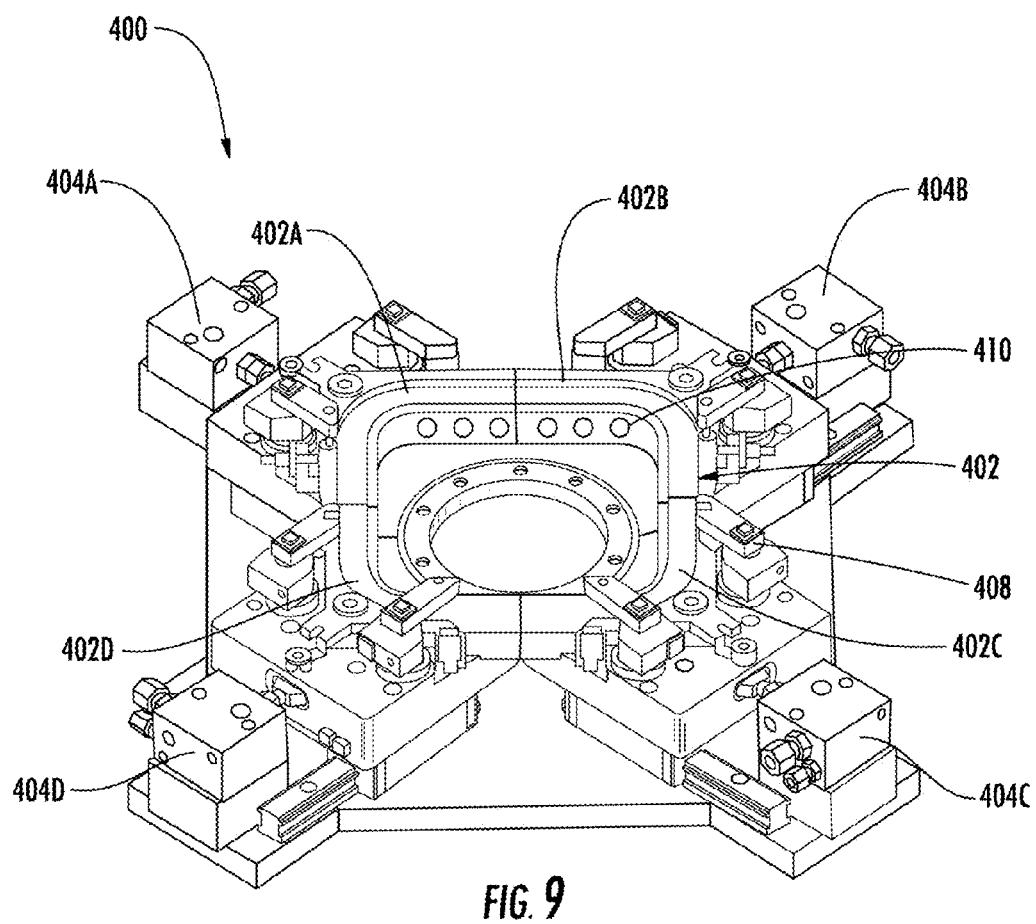
FIG. 9 illustrates a partial perspective view of a system for friction stir welding including multiple tool sensors and multiple part sensors configured to perform dynamic path correction according to an example embodiment of the present disclosure.

One embodiment of a system 400 in accordance with the present disclosure is illustrated in FIG. 9, with the actuator, controller, and friction stir welding tool not shown for clarity purposes. As illustrated, the system 400 may include a fixture 402 comprising multiple sections 402A-D. A corresponding plurality of compression assemblies 404A-D may be configured to move the portions 402A-D of the fixture 402 inwardly to compress the parts received therein to assist in the friction stir welding operation. Each of the compression assemblies 404A-D may be mounted to a respective base in some embodiments. A plurality of tool sensors 408 and a plurality of part position sensors 410 may be mounted to the fixture 402. The tool sensors 408 may be positioned above the fixture 402 in order to align with the friction stir welding tool, and the part position sensors 410 may be positioned at an inner wall of the fixture 402 in order to align with one or more parts received therein. However, various other systems may be provided that operate in accordance with the present disclosure.

Figure 10:
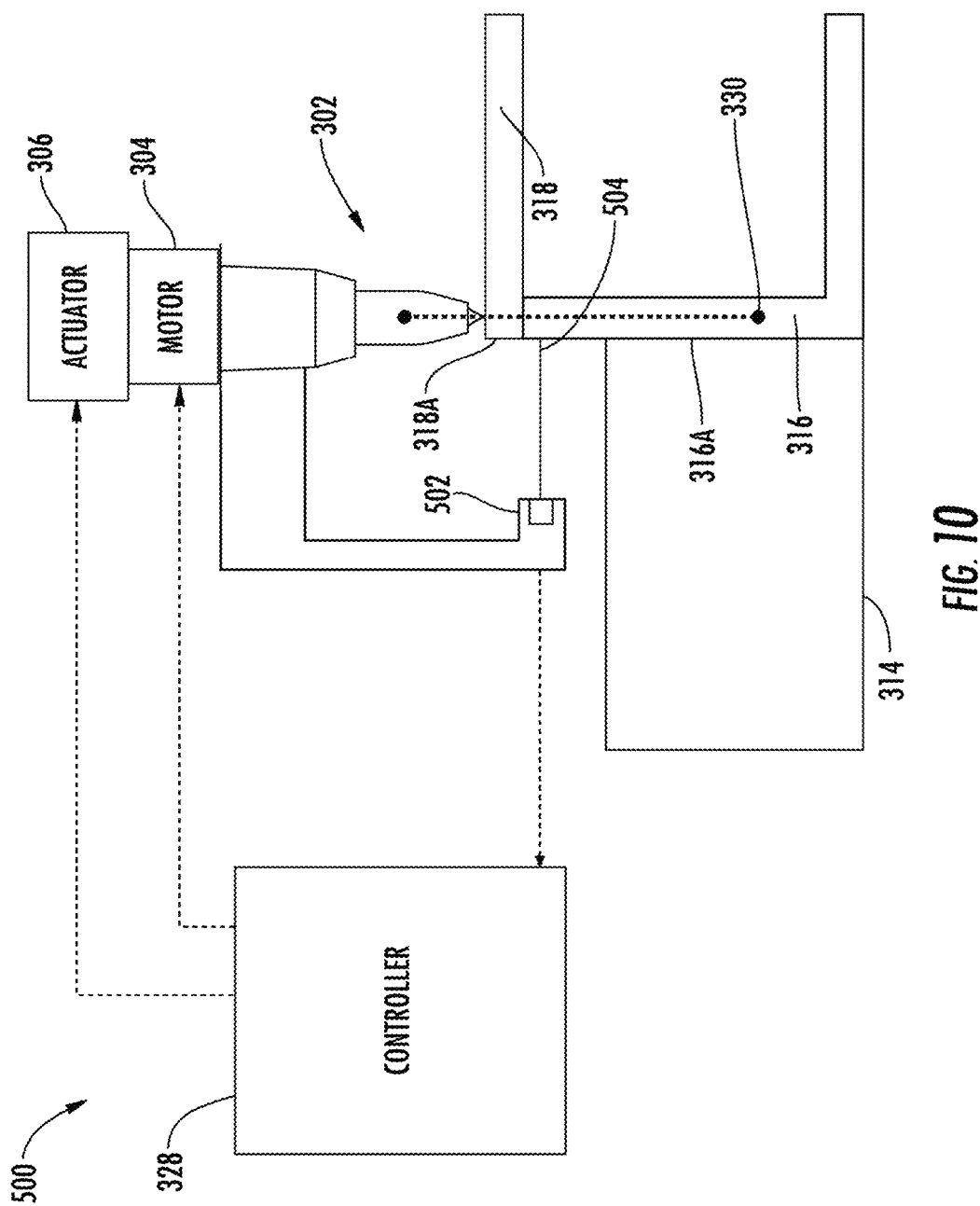
FIG. 10 illustrates a schematic view of a system for friction stir welding including a sensor mounted to a friction stir welding tool configured to perform dynamic path correction according to an example embodiment of the present disclosure.

Further, although the embodiments described above generally refer to use of separate tool and part sensors, in an alternate embodiment a sensor may be directly or indirectly mounted to the friction stir welding tool. In this regard, by way of example, FIG. 10 illustrates an embodiment of a system 500 which is substantially similar to the system 300 illustrated in FIG. 5, except, rather than including separate tool and part sensors, the system includes a sensor 502 mounted to the friction stir welding tool 302. Thereby, a distance 504 measured between the sensor 502 and at least one of the parts 316, 318, may be employed by the controller 328 to determine the relative distance between the friction stir welding tool and at least one of the parts. In this regard, determining the position of the friction stir welding tool 302 and determining the position of at least one of the parts 316, 318 may be conducted simultaneously in some embodiments, by determining the distance therebetween. However, note that use of separate tool and part sensors may be preferable where it is difficult to position a sensor mounted to the friction stir welding tool in proximity to the parts.

Note also that the various sensors 320, 322, 502 described herein may comprise optical sensors in one embodiment. However, various other embodiments of sensors may be employed such as proximity, displacement, transducer, inductive, ultrasonic, capacitive, and magnetic sensors.

Figure 11:
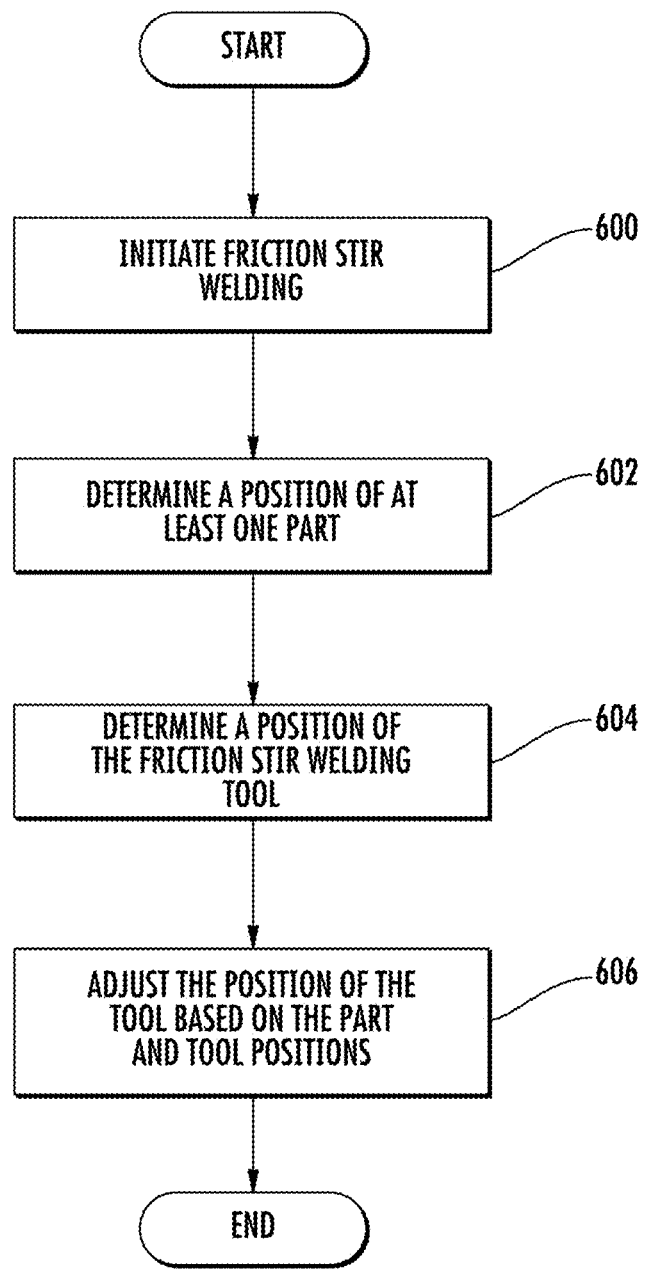
FIG. 11 illustrates a method for controlling friction stir welding according to an example embodiment of the present disclosure.

A related method for controlling friction stir welding is also provided. As illustrated in FIG. 11, the method may include initiating friction stir welding of a first part to a second part with a friction stir welding tool at operation 600. Further, the method may include determining a position of the friction stir welding tool during the friction stir welding at operation 602. The method may also include determining a position of at least one of the first part and the second part at operation 604. Additionally, the method may include adjusting the position of the friction stir welding tool while friction stir welding the first part to the second part based at least in part on the position of the friction stir welding tool and the position of at least one of the first part and the second part at operation 606.

In some embodiments determining the position of the friction stir welding tool at operation 604 may comprise determining the position of the friction stir welding tool with an optical sensor. Similarly, determining the position of at least one of the first part and the second part at operation 602 may comprise determining the position of at least one of the first part and the second part with an optical sensor. Further, determining the position of at least one of the first part and the second part at operation 602 may comprise determining the position of at least one of the first part and the second part downstream of the friction stir welding tool. Determining the position of at least one of the first part and the second part downstream of the friction stir welding tool may comprise determining the position of at least one of the first part and the second part at a first location downstream of the friction stir welding tool and at a second location downstream of the first location.

The method may additionally include calculating an approximation of the position of at least one of the first part and the second part. Calculating the approximation may comprise calculating a linear approximation of the position of at least one of the first part and the second part. Further, the method may include adjusting the approximation to determine an expected position of at least one of the first part and the second part when the friction stir welding tool reaches the first location.

Figure 12:
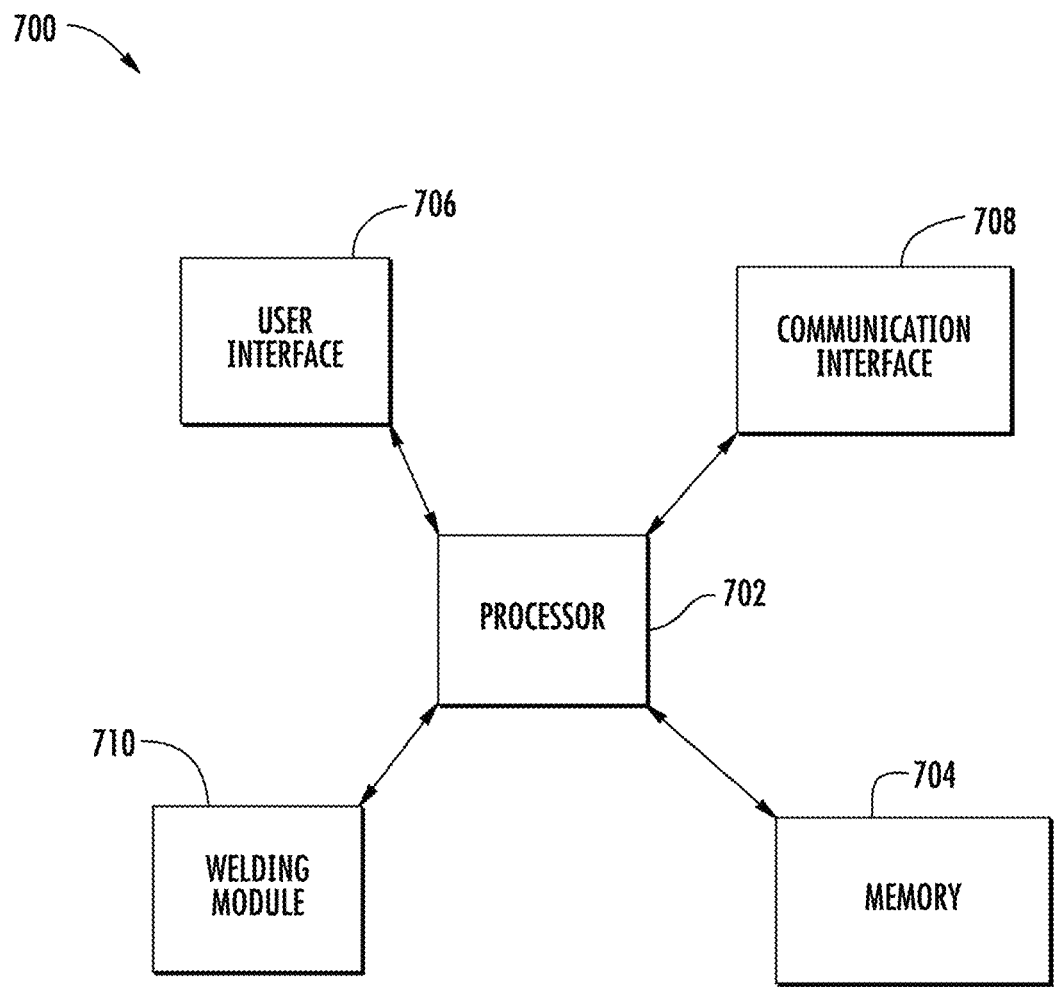
FIG. 12 illustrates a block diagram of an electronic device according to an example embodiment of the present disclosure.

FIG. 12 is a block diagram of an electronic device 600 suitable for use with the described embodiments. In one example embodiment the electronic device 600 may be embodied in or as the controller 328 for a friction stir welding system. In this regard, the electronic device 600 may be configured to control or execute the above-described friction stir welding operations.

The electronic device 700 illustrates circuitry of a representative computing device. The electronic device 700 may include a processor 702 that may be microprocessor or controller for controlling the overall operation of the electronic device 700. In one embodiment the processor 702 may be particularly configured to perform the functions described herein. The electronic device 700 may also include a memory device 704. The memory device 704 may include non-transitory and tangible memory that may be, for example, volatile and/or non-volatile memory. The memory device 704 may be configured to store information, data, files, applications, instructions or the like. For example, the memory device 704 could be configured to buffer input data for processing by the processor 702. Additionally or alternatively, the memory device 704 may be configured to store instructions for execution by the processor 702.

The electronic device 700 may also include a user interface 706 that allows a user of the electronic device 700 to interact with the electronic device. For example, the user interface 706 can take a variety of forms, such as a button, keypad, dial, touch screen, audio input interface, visual/image capture input interface, input in the form of sensor data, etc. Still further, the user interface 706 may be configured to output information to the user through a display, speaker, or other output device. A communication interface 708 may provide for transmitting and receiving data through, for example, a wired or wireless network such as a local area network (LAN), a metropolitan area network (MAN), and/or a wide area network (WAN), for example, the Internet.

The electronic device 700 may also include a welding module 710. The processor 702 may be embodied as, include or otherwise control the welding module 710. The welding module 710 may be configured for controlling friction stir welding operations.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling machining operations. In this regard, a computer readable storage medium, as used herein, refers to a non-transitory, physical storage medium (e.g., a volatile or non-volatile memory device, which can be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for controlling a friction stir welding operation, the method comprising:
   initiating friction stir welding of a first part to a second part with a friction stir welding tool along a welding path, the welding path corresponding to a junction between the first part and the second part;
   determining a position of the friction stir welding tool during the friction stir welding;
   determining a position of at least one of the first part and the second part, downstream of the friction stir welding tool;
   predicting an amount of lateral displacement of the junction with respect to the welding path using at least the determined positions; and
   dynamically correcting the welding path of the friction stir welding tool while friction stir welding the first part to the second part to account for the predicted lateral displacement of the junction with respect to the welding path during the welding operation.

2. The method of claim 1, wherein determining the position of the friction stir welding tool comprises determining the position of the friction stir welding tool with one or more sensors.

3. The method of claim 1, wherein determining the position of at least one of the first part and the second part comprises determining the position of at least one of the first part and the second part with one or more optical sensors.

4. The method of claim 1, wherein determining the position of at least one of the first part and the second part downstream of the friction stir welding tool comprises determining the position of at least one of the first part and the second part at a first location downstream of the friction stir welding tool and at a second location downstream of the first location.

5. The method of claim 4, further comprising calculating an approximation of the position of at least one of the first part and the second part.

6. The method of claim 5, wherein calculating the approximation comprises calculating a linear approximation of the position of at least one of the first part and the second part.

7. The method of claim 5, further comprising adjusting the approximation to determine an expected position of at least one of the first part and the second part when the friction stir welding tool reaches the first location.

8. The method as recited in claim 2, wherein the one or more sensors comprise an optical sensor mounted to the friction stir welding tool.

9. The method as recited in claim 3, wherein the one or more sensors comprise an optical sensor.

10. The method as recited in claim 2, further comprising:
    constraining the first and second parts with a fixture, wherein the one or more sensors comprise a plurality of sensors mounted to the fixture.

11. The method as recited in claim 3, further comprising:
    periodically tracking a position of the friction stir welding tool during a friction stir welding operation with the one or more sensors that are distributed proximate to the welding path of the friction stir welding tool.

12. The method as recited in claim 2, wherein the one or more sensors comprise a tool sensor configured to determine the position of the friction stir welding tool and a part sensor configured to determine the position of at least one of the first part and the second part.

13. A method for guiding a friction stir welding tool during a friction stir welding operation, the method comprising:
    providing a welding path to the friction stir welding tool, the welding path corresponding to a junction between a first part and a second part prior to applying the friction stir welding operation to join the first and second parts along the junction;
    detecting a position of a portion of the first part downstream of the friction stir welding tool using at least an optical sensor;
    predicting an amount of lateral movement of the junction with respect to the welding path using at least the detected position; and
    dynamically adjusting the welding path of the friction stir welding tool during the friction stir welding operation in accordance with the predicted lateral movement.

14. The method as recited in claim 13, wherein the optical sensor is coupled to a fixture operable to support at least one of the first and the second part during the friction stir welding operation.

15. The method as recited in claim 13, wherein the detected portion of the first part is downstream of a position of the friction stir welding tool.

16. The method as recited in claim 13, further comprising:
    detecting a position of the friction stir welding tool, wherein the predicting is also based on the detected position of the friction stir welding tool.

17. The method as recited in claim 13, wherein the friction stir welding tool is guided by a robotic assembly configured to receive instructions for dynamically adjusting the welding path.

* * * * *